Figure 1:
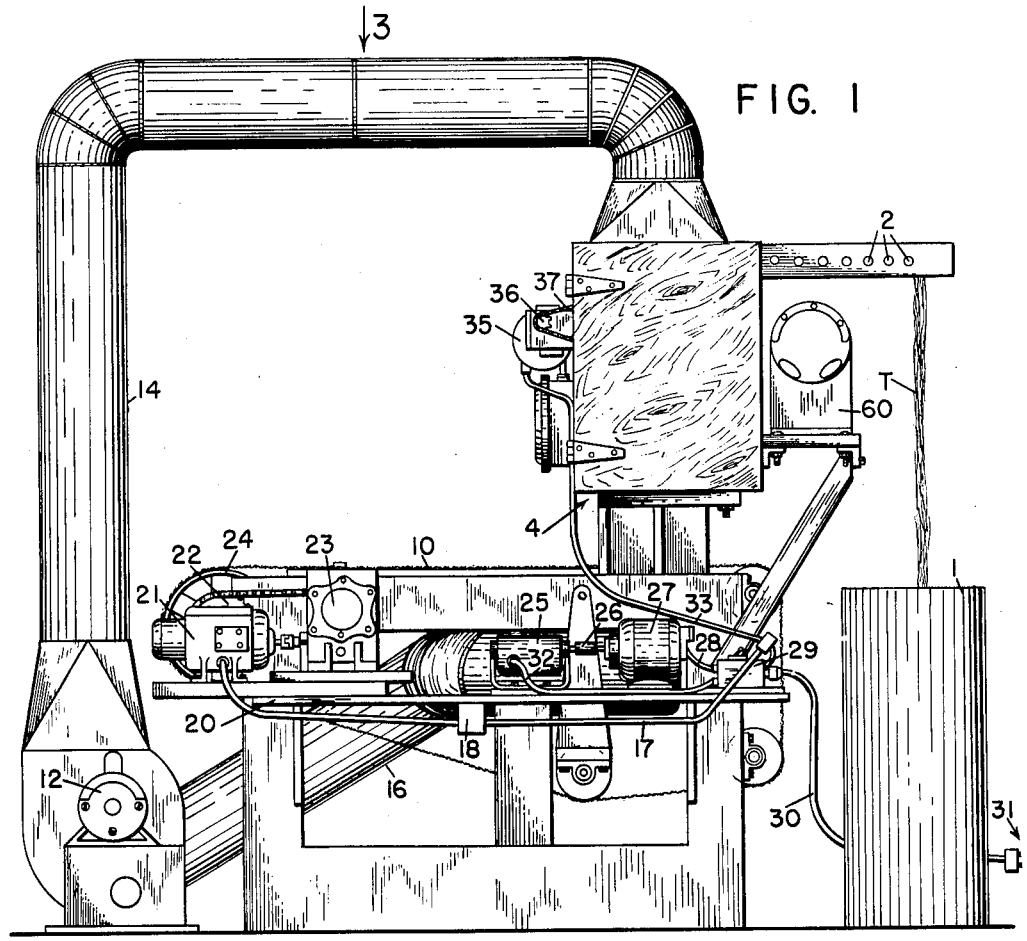

March 17, 1964 T. T. CONSTANTINE ETAL 3,124,844
MEANS TO PROCESS FIBERS IN A TOW OR SHEET-LIKE MATERIAL
Original Filed June 10, 1960 5 Sheets-Sheet 1

INVENTORS
THOMAS T. CONSTANTINE
RICHARD D. WELLS

*Chas. T. Hawley*
ATTORNEY

March 17, 1964 T. T. CONSTANTINE ETAL 3,124,844
MEANS TO PROCESS FIBERS IN A TOW OR SHEET-LIKE MATERIAL
Original Filed June 10, 1960 5 Sheets-Sheet 2
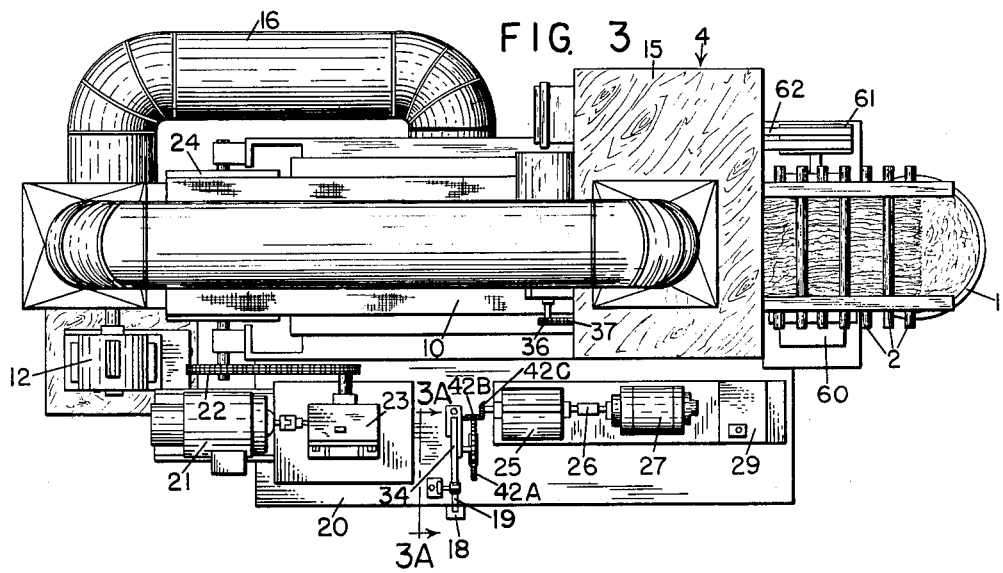
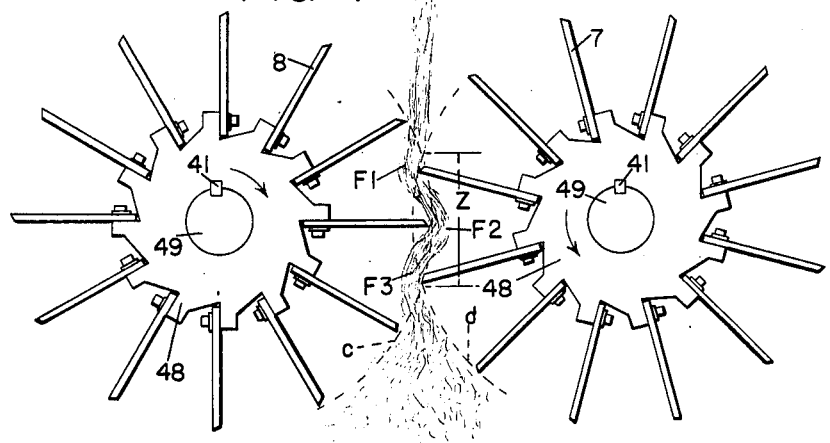
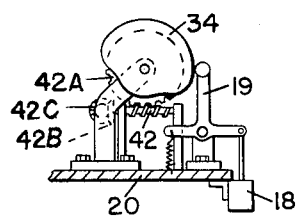
INVENTORS
THOMAS T. CONSTANTINE
RICHARD D. WELLS
*Chas. T. Hawley*
ATTORNEY March 17, 1964  T. T. CONSTANTINE ETAL  3,124,844
MEANS TO PROCESS FIBERS IN A TOW OR SHEET-LIKE MATERIAL
Original Filed June 10, 1960  5 Sheets-Sheet 3

INVENTORS
THOMAS T. CONSTANTINE
RICHARD D. WELLS

ATTORNEY

March 17, 1964 T. T. CONSTANTINE ETAL 3,124,844
MEANS TO PROCESS FIBERS IN A TOW OR SHEET-LIKE MATERIAL
Original Filed June 10, 1960 5 Sheets-Sheet 4
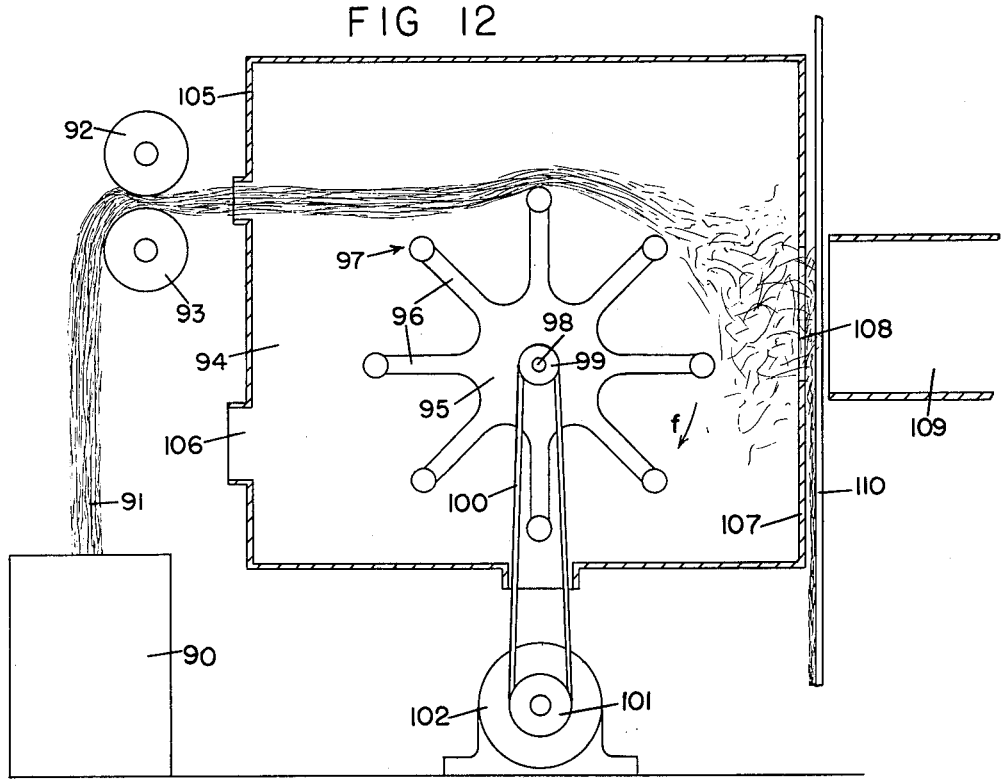
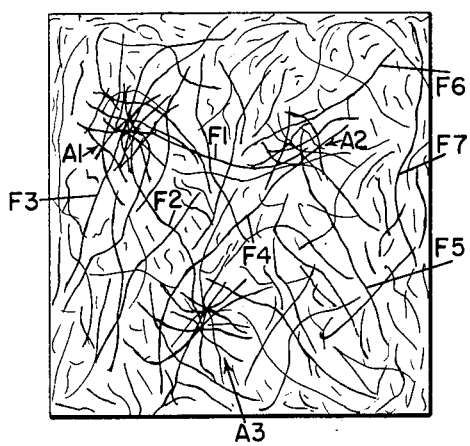
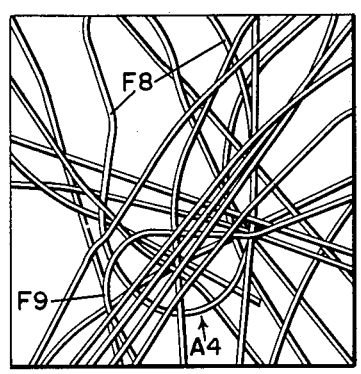
INVENTORS
THOMAS T. CONSTANTINE
RICHARD D. WELLS
Chas. T. Hawley
ATTORNEY ', 'United States Patent Office 3,124,844
Patented Mar. 17, 1964

3,124,844
MEANS TO PROCESS FIBERS IN A TOW OR SHEET-LIKE MATERIAL
Thomas T. Constantine, South Easton, and Richard D. Wells, Westwood, Mass., assignors to Crompton & Knowles Corporation, Worcester, Mass., a corporation of Massachusetts
Original application June 10, 1960, Ser. No. 35,157, now Patent No. 3,071,821, dated Jan. 8, 1963. Divided and this application Dec. 29, 1960, Ser. No. 79,360
19 Claims. (Cl. 19—155)

This application is a division of our copending application, Serial No. 35,157 filed June 10, 1960, now U.S. Patent No. 3,071,821, which application relates to a method of producing discontinuous fibers from continuous filaments incident to forming a nonwoven web. This divisional application relates more particularly to a machine for producing a nonwoven web from a tow of continuous filaments.

Most commercially available nonwoven webs and fabrics consist for the most part of pre-cut commercial staple fiber which must be opened, blended (if required) and then, depending upon the particular process involved, this fiber must be distributed upon a collector or conveyor such as will form a linear sheet-like material.

Much of the equipment used to produce nonwoven material today is merely cotton and woolen converting equipment which has been slightly modified to suit the purpose. Specifically, carding and garnetting machines are utilized to the greatest extent. Due to certain inherent properties of these machines an oriented type web is produced at the sacrifice of a certain quality, usually referred to as randomness, which contributes in high degree to the integrity and over-all physical properties of a nonwoven web.

There are also available equipments which feature the so-called "air lay" process which produce a fabric or web exhibiting a random distribution of fibers. The "air lay" type of equipment is restricted to a maximum fiber length of something in the order of 2.5 inches.

Virtually all nonwoven fabrics as produced today require the addition of certain binding agents in order to improve the cohesiveness of the web. Without these additives the web would have no integrity whatever and would fall apart with handling.

It is an important object of the invention to provide a nonwoven fabric or web consisting of randomly distributed fibers of varying lengths. Some of these fibers are sufficiently long so as to make contact with a large number of shorter filaments and by frictional engagement tend to hold them in a fixed position with respect to adjacent fibers. This has a marked effect toward strengthening of the web structure.

Many of the fibers in the webs produced as set forth herein are less than 2" in length. There are, however, many fibers that exceed 2" and may reach 4 or more inches in length. It has been noticed that these longer fibers have a tendency to become entangled with other adjacent shorter fibers and produce a chain-linking effect. When this interconnection of fiber bundles is distributed throughout the web a demonstratable amount of inherent strength or integrity is realized.

It is a further object of the invention to provide means for converting continuous filamentous tow having a free leading end portion directly without the usual preliminary steps into a continuous web or sheet-like structure. Tow as used here imples a bundle of continuous filamentous fibers, more particularly a bundle of 75,000, more or less, filaments of 3 denier each, more or less. Elimination of the preliminary steps alluded to above is considered to be important since no pre-cutting of the tow into staple fiber lengths is necessary. The opening and separation of cut staple is also eliminated. Blending of two or more different staple lengths is still another step which is eliminated.

It is another object of the invention to provide a web having localized areas of reenforcements wherein the longer fibers make a partial or complete turn around other fibers and the longer of the fibers are found to extend from one localized area to another, thereby providing an internal network of connections between the localized areas which greatly increase the strength of the web.

It is another object of the invention to move the leading end portion of the tow downwardly into an operating zone in which the continuous filaments of the tow are subjected to frictional, tensile stress rupturing forces applied with a strong downward component at a high rate of speed the effect of which is to produce discontinuous filaments of random lengths which are thereafter condensed or collected on a conveyor. In this manner the discontinuous filaments leave the end portion so that a discontinuity of the end portion is effected.

It is another object of the invention to provide mechanism for rupturing continuous filaments of the tow into discontinuous fibers of varying lengths comprising rotating sets of beater blades which move the filaments first in one direction and then in the opposite direction and exert tensional stresses on the filaments in the downward direction in which they are fed to the operating zone. The beater blades have sharpened edges preferably notched or toothed which directly engage the filaments of the tow and move along them in a manner to cause the aforesaid rupturing at points between the feed and the blades where they engage the filaments.

The rotating blades create air drafts within the hopper in which the operation is carried out and part of the air currents which are induced by the blades have a tendency to move some of the fibers back into the operating zone where they might become entangled with other fibers in such a way as to create new entanglements. It is a further object of the invention to utilize the air currents created by the blades to produce the aforesaid new entanglements.

In the art of producing nonwoven webs it is common practice to blow cut staple fibers against a perforated conveyor by a pneumatic system employing a blower. It is found that the sets of blades already mentioned, when turning at a high rate of speed, create air currents which move the broken off fibers toward the conveyor. A blower system in a closed air circuit is shown in the drawings but it is not depended on solely for condensing of the fibers. It is a further object of the invention to provide beater blades which not only rupture fibers from the filaments, but also direct them downwardly toward the conveyor which passes through the circuit.

It is a further object of the invention to provide a hopper including an inner chamber having a side which is adjacent to and inclined towards the conveyor and in the direction in which the latter moves. This inclined side is located in such position that at least some of the fibers will be directed against it and will slide along it toward the conveyor under a differential pneumatic action between the hopper and chamber and be deposited transversely of the length of the web.

The tow should be fed downwardly to the operating zone preferably at a uniform rate and at the same time be subject to sufficient holding force to prevent the beater blades from advancing the filaments as a whole faster than this rate. It is accordingly a further object of the invention to provide a single set of side by side feed rolls at least one of which will have a deformable surface, as of rubber, providing means for adjusting the horizontal distances between the rolls to cause the latter to exert enough holding force on the tow to resist forward feeding forces directed against it by the beater blades.

It has been found that for best operating conditions with a given tow such as 3 denier/filament viscose tow there is a relationship between the rate of feed of the tow and the number of impacts which the beater blades exert on it. Thus, for instance, for each inch of feed of the tow it is desirable that the number of beating actions by the blades be from 3,000 to 5,000 beats. The faster the beater blades rotate relative to the feed rolls, the shorter will be the fibers which are disengaged from the tow. If, on the other hand, the beater blades turn slower with respect to the feed, then some of the fibers will form unbroken tails that will ultimately reach the conveyor. It is another object of the invention to provide means to adjust the speed of rotation of the feed rolls and also the rate of rotation of the sets of beater blades to enable the invention to produce fibers of the desired average length.

The invention here described can be termed as an inherently noncritical operation in that the mechanism is in no way limited to a particular fiber length or denier. The several controllable elements are of a basically simple nature and slight deviations from any set of control conditions does not seriously affect the final product.

Figure 2:
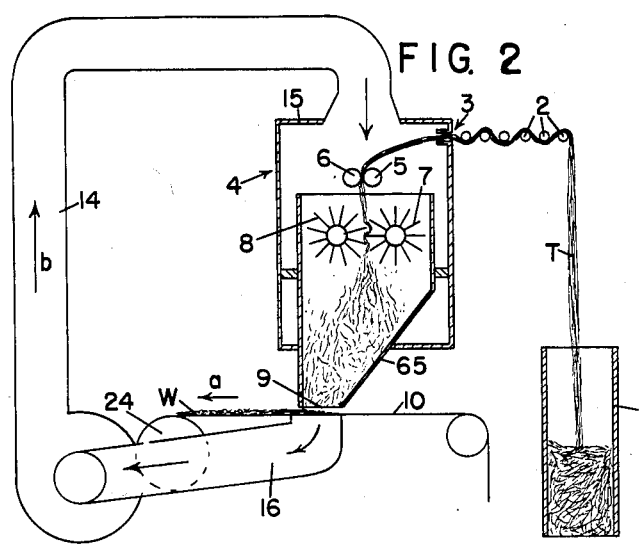
Figure 9:
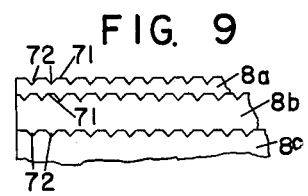
Figure 4:
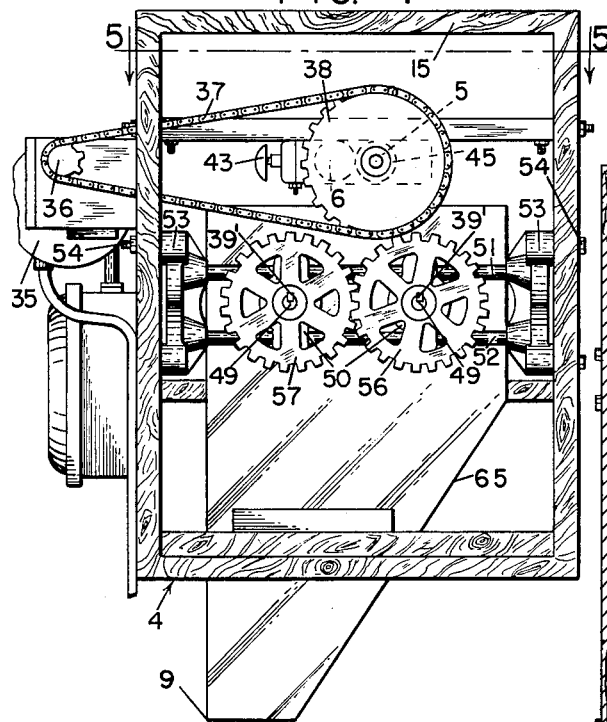
Figure 5:
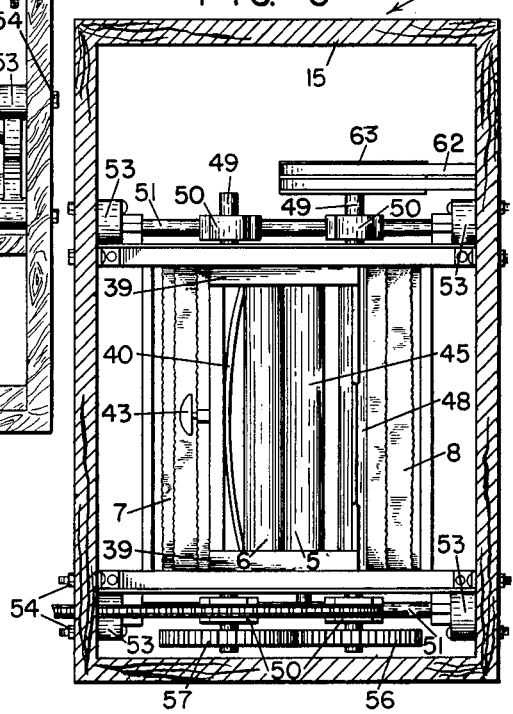
Figure 6:
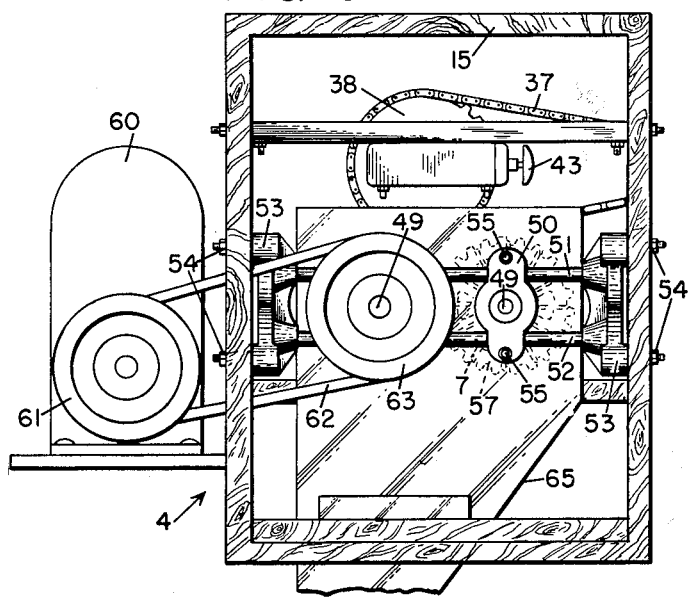
Figure 8:
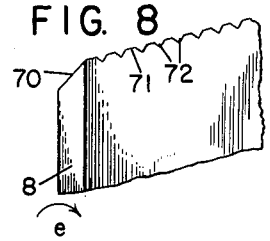
Figure 13:
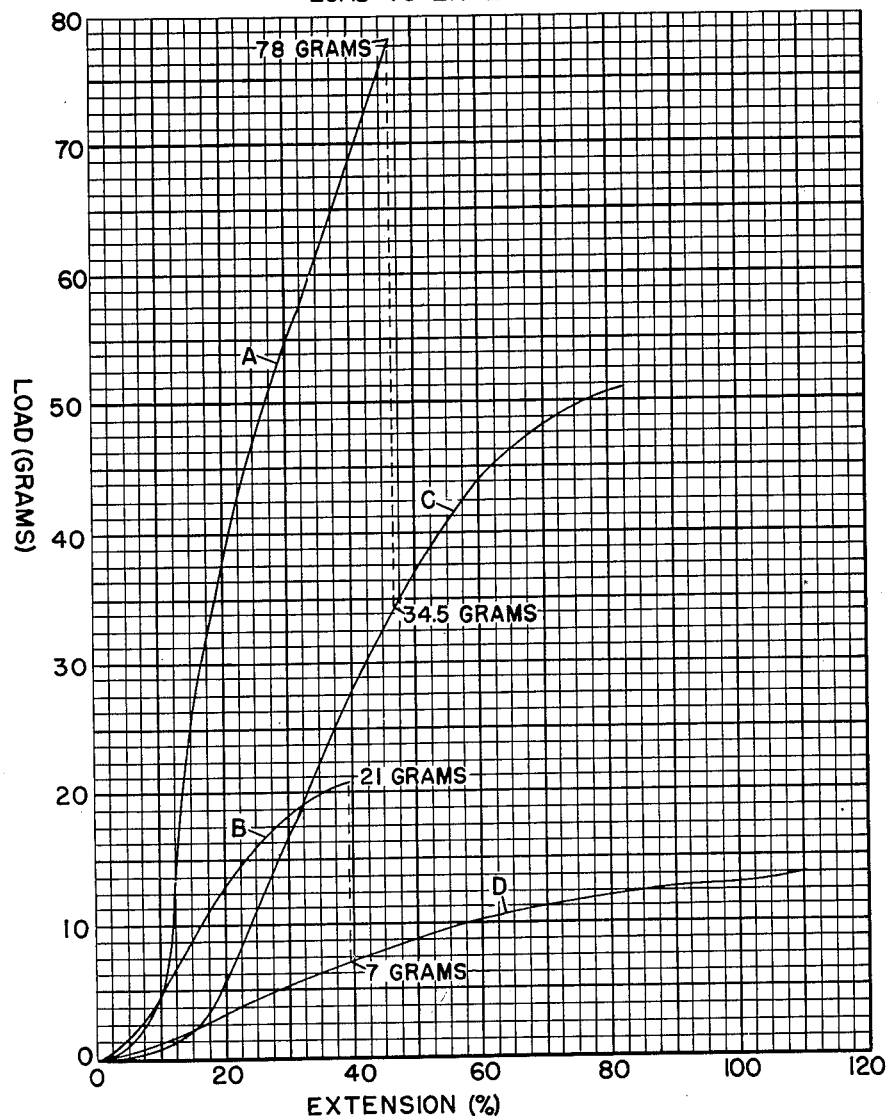

In order that the invention may be clearly understood reference is made to the accompanying drawings which illustrate by way of example two embodiments of the invention and in which:

FIG. 1 is a side elevation of a machine designed and built according to the present invention and adapted to carry out the aforesaid method for the production of a web having the previously mentioned characteristics, FIG. 2 is a diagrammatic view of a portion of FIG. 1, showing the interior of the hopper and inner chamber, the vertical tow feed, the two sets of blades, the previously mentioned inclined surface of the hopper, and the conveyor, FIG. 3 is a plan view of the structure shown in FIG. 1, FIG. 3A is a detail vertical section on line 3A—3A, FIG. 3, FIG. 4 is an enlarged view of a part of FIG. 1 having the hopper door opened to show the interior of the mechanism, such as the gearing for the sets of blades and the drive for the feed rolls, FIG. 5 is a horizontal section on line 5—5, FIG. 4, FIG. 6 is a view somewhat similar to FIG. 4 but shows the structure as viewed from the opposite side of the hopper, FIG. 7 is a detailed view showing the two sets of beater blades and the cylinders on which they are mounted and the manner in which their paths intersect in a vertically arcuate manner, FIG. 8 is a detail perspective of part of one of the beater blades on an enlarged scale, FIG. 9 is a diagrammatic view showing the edges of adjacent blades, FIG. 10 shows diagrammatically how longer fibers join local areas of grouped shorter fibers, FIG. 11 is a magnified view of fibers forming one of the aforesaid areas of reenforcement, FIG. 12 shows partly in diagram a modified form of tow to web machine, and FIG. 13 is a graph showing the tensile strengths of webs made according to the present invention compared with other known webs.

Referring particularly to FIGS. 1 and 2, the tow is supplied from a can 1 and may be either uncrimped or crimped and is drawn over and under rods 2 as indicated in FIG. 2 and then passes through an inlet 3 into a hopper designated generally at 4 which includes an inner chamber as clearly shown in FIG. 2. The tow will have many thousands of fine filaments and the effect of the bars 2 is to tend to spread them and produce some tension on the filaments. In the practice of the invention it may be desirable occasionally to direct a blast of air at the tow just below the bars to insure an initial separation of the filaments.

The tow then goes between right and left horizontal feed rolls 5 and in side by side frictional contact 6, FIG. 2, which are turned by means to be described and then passes down between right and left-hand sets of beater blades 7 and 8 respectively through an operating zone beneath said feed rolls in substantial vertical alignment with the point of contact where the continuous filaments are broken up into discontinuous fibers. The fibers are then blown down out of a bottom throat 9 of the inner chamber onto a pervious conveyor 10. As contemplated in FIG. 2, the conveyor will move to the left in the direction of arrow a.

The machine is equipped with a pneumatic closed circuit system including a pump 12 which has the effect of forcing air upwardly as indicated by arrow b through a pipe 14 and into the top 15 of the hopper, then downwardly through the hopper and conveyor to a return pipe 16 under the conveyor and thence back to the pump. When the latter is in operation there is a constant stream of air coming into the top of the hopper and blown out of the bottom and assisting in depositing the fibers onto the conveyor. The beater elements and feed rolls are located within the hopper, see FIG. 2.

Referring more particularly to FIGS. 1, 2 and 3, a table 20 supports a preferably direct current motor 21 operatively connected to a sprocket wheel 22 through a speed changer 23. Wheel 22 drives a drum 24 around which the conveyor 10 is trained. Motor 21 can be controlled electrically in any approved manner by switches or the like not shown herein. The speed changer 23 affords means for varying the linear rate of travel of the conveyor whereby, if desired, a web having some parts thereof thicker than other parts thereof may be produced.

Also mounted on the table 20 is a preferably alternating current motor 25 which by coupling 26 is connected to a direct current generator 27 having a lead 28 extending to a control box 29 which includes a rheostat (not shown). A power cable 30 from a source indicated generally at 31 feeds electric power through the box 29 to the alternating current motor via line 32.

A feed electric cable 33 leads from the box 29 to a motor 35 suitably mounted on the hopper 4. This motor has a small sprocket 36 to drive a chain 37 which, as shown in FIG. 4, drives a sprocket wheel 38 secured to feed roll 5 rotatable in bearings 39 mounted on the interior of the hopper. The feed roll 6 has direct frictional contact with the feed roll 5 and is floatingly mounted in horizontal relationship with roll 5 so that the horizontal distance and pressure between the rolls 5 and 6 can be varied by pressure of a leaf spring 40 adjustable by hand grip 43. One of these rolls, namely 5 as shown herein, has a peripheral coating 45 of soft deformable material, such as rubber, the deformation of which can be altered by changing the distances between the rolls 5 and 6 for the purpose of increasing or decreasing the frictional grip which the roll 5 has on the tow. The rheostat in box 29 provides means for varying the speed of motor 35 so that the rate of turning of the feed rolls can be varied to give the desired feed of the tow.

Motor 21 is supplied with direct current from rectifier 27 through cable 17 leading to a resistance box 18 for the field of motor 21. A lever 19 pivoted with respect to table 20 engages a cam 34 driven by a worm wheel 42A meshing with a worm 42 which is driven by meshing bevel gears 42B and 42C powered by motor 25. As the latter turns the cam causes arm 19 to rock to change the resistance 18 in series with the field of motor 21 to vary its speed, see FIGS. 3 and 3A.

The sets of beater blades are mounted as shown in FIG. 7, each set being on a cylinder 48 mounted on a shaft 49 turning in bearings 50, see FIG. 5. The cylinders 48 are in side by side spaced relationship underneath and remote from feed rolls 5 and 6. The bearings at each end of the cylinders are mounted on two horizontal rods 51 and 52 which are held in fixed position by supports 53 secured at 54 to the hopper. By means of adjusting and holding screws 55 the bearings 50 can be slid along the rods 51 and 52. The right and left-hand shafts 49, FIG. 4, are operatively connected by equal gears 56 and 57 respectively which are keyed at 39' to their shafts and mesh to cause the cylinders 48 and their blades to rotate in unison in opposite directions. The cylinders are keyed at 41 to their shafts 49 in such a relation that the blades of one cylinder will enter spaces between the blades of the other cylinder to preserve the registry shown in FIG. 7. The blades of the cylinders extend radially therefrom in nonenagageable meshing relationship at a point remotely below and in substantial vertical alignment with a nip formed by feed rolls 5 and 6. The axes of cylinders 48 and their blades are in a horizontal plane below a horizontal plane in which the axes of rolls 5 and 6 lie.

The cylinders 48 are rotated by an electric motor 60 supported on the hopper 4 and connected by a pulley 61 and belt 62 to a pulley 63 fast on one of the shafts 49. The motor 60 can be controlled in any approved manner by a switch or the like and provision is made for changing the rate of drive of the cylinders 48 with respect to the motor 60. In the present instance this change is afforded by making the pulleys 61 and 63 of the Reeves, or expanding and contracting type, thus enabling the cylinders 48 to be rotated faster or slower, as the case may be.

In the operation of the mechanism thus far described the rate of feed of the tow T, rotation of the sets of blades 7 and 8 and their amount of overlap and the rate of travel of the conveyor belt having been determined, all of the motors will be set in operation. The feed rolls will draw the tow from cam 1 and advance it downwardly beyond the rolls and between the two sets of beater blades. At this time the pneumatic system controlled by the pump 12 will be in operation so that air will enter the hopper from above and will be leaving it from below and return to the pump via pipe 16.

As the beater blades rotate the tow filaments or end portion thereof between the two sets are flexed first in one direction as to the left at F1, FIG. 7, then in the opposite direction as at F2, then again to the left, as at F3, etc. The blades will be turning at a high rate of speed and each filament will be subjected to a large number of flexings and frictional brushings during the time it is in position to be engaged by the blades as they rotate downwardly. As shown in FIG. 7, the paths traversed by the edges of the left-hand set of blades is indicated by the arc c, while the similar edges of the right-hand set of blades move along a path indicated by the arc d. The paths are vertically arcuate and overlap to form a working zone which is symmetrically located in substantial vertical alignment with the contact point of rolls 5 and 6. The area Z between the intersections of these two arcs may be considered as the approximate operating zone in which the filaments of the two are subjected to their alternate flexings. The portion of the tow bounded on its lower end by the reference numeral F3 and on its upper end by the nip of the feed rolls 5 and 6, FIGS. 2 and 7, may be considered as the free leading end portion of the tow. It is to be noted that the end portion is in substantial vertical alignment with the zone and where the feed rolls contact each other.

It is found that the alternate paths of the leading end portion first in one direction and then the other results in breaking the tow into fibers having various lengths and as the fibers are broken off they are blown downwardly by a down draft of air created by the blades as they rotate. The down draft causes some of the fibers to be separated from the continuous filaments and be propelled toward the conveyor. In one instance in which the invention has been operated the cylinders 48 were rotated at 1500 r.p.m. and the feed rolls were turned at a rate to feed 12" of tow per minute.

The inner chamber of the hopper 4 is provided with an inclined fiber deflector wall 65 which is slanted downwardly and in the direction of feed of the conveyor as shown for instance in FIG. 2. Many of the fibers will be broken off of the free leading end portion of the tow and will be eventually blown against this inclined wall and will tend to straighten out in a direction transverse of the feed of the conveyor so that when they emerge from the mouth or throat 9 of the chamber they will be of random lengths for depositing on the conveyor and will be in corporated into the web W transverse of its length. Many other of the fibers will be oriented lengthwise of the web while still other fibers will be deposited at random angles. During the operation of the machine the web will be delivered to the left from the mouth 9 as viewed in FIG. 2 and convenient lifter means (not shown) may be employed to remove the web from the conveyor 10.

A salient feature of the invention is the vertical feed of the tow and its leading end portion and the relationship of the beater blade elements underneath the feed rolls, see FIG. 2, since thereby, gravitational forces can act to aid in maintaining the tow and fibers thereof in registry with and between the sets of beater blades.

The beater elements rotate about horizontal axes below the horizontal axes of the feed rolls, and the elements which are moving upwardly as they rotate tend to create air streams in a direction to lift at least some of the fibers above the elements to enable such fibers to pass between the members with opportunity to become entangled with other filaments between the members.

An important feature of the invention is the ratio between the rate of feed of the tow to the operating zone and the number of beatings to which the filaments will be subjected while in the zone. In one instance it was found desirable to subject the filaments to from 3,000 to 5,000 beatings per inch of feed of the tow toward the operating zone. Twenty-four blades were used, 12 on each cylinder 48, as shown in FIG. 7. The invention is not limited, however, to this number of blades.

FIGS. 8 and 9 show details of the edges of the beater blades which strike and brush the filaments. FIG. 8 shows part of a blade which moves in the direction of arrow e. The edge of the blade is beveled as at 70 and has a sharp edge 71 which is interrupted by notches 72. These notches are V-shaped preferably with edges that come together at a point rather than being blunt at their lower ends. In the machine as built the notches were about 1/16 inch apart and 1/32 inch deep, and their sides were sharp.

FIG. 9 shows one arrangement of notches which can be used on adjacent blades. Blades 8a and 8c can have their notches more or less aligned circumferentially in register with the cutting edges 71 of blade 8b. Each blade will thus hold a group of filaments in a notch aligned with a cutting edge of an adjacent blade. FIG. 9 shows the blades on one of the cylinders 48 but a similar arrangement can be employed for both sets of blades, and if desired a blade 7 can have its notches aligned with cutting edges on the next blade 8 to engage the filaments. The blades of each set extend longitudinally of the axis thereof beyond the zone of contact with the tow and are preferably made of tempered steel and are imperforate so that they are capable of moving streams of air to blow fibers downwardly towards the conveyor. The blades will also act, as by brushing downwardly, to abrade the filaments in a manner to establish a high coefficient of friction between the edges of the blades and the filaments.

Another form of the machine which can be utilized to produce the web is shown in FIG. 12 and comprises can 90 from which a tow 91 is fed by top and bottom rolls 92 and 93 respectively into a box or chamber 94 in which is rotatably mounted a spider wheel 95. This wheel in effect has rods or the like 96 which have abrasive tips made of crystals or hardened steel or carbide elements designated generally at 97. The wheel is mounted on a shaft 98 and is driven by means of a sprocket 99, chain 100, sprocket 101, and motor 102.

The left wall 105 of the box 94 as shown in FIG. 12 has an air inlet passage 106 and the right-hand wall 107 has an outlet passage 108 which communicates with a suction device 109. A screen 110 passes downwardly to the right of the outlet 108 and mechanism not shown is provided for driving the screen downwardly to a take-off device where the web on it can be scraped away from the screen or conveyor.

In the operation of the form of the machine shown in FIG. 12 the motor drives the spider wheel 95 at a fairly low rate of speed, such as 500 r.p.m., and the tow lies over the wheel so that the bars 96 ride up under it as the wheel turns in the direction of arrow $f$. Because of the friction of the abrasive tips and the fact that the feed rolls 92 and 93 restrain movement of the tow into the box 94, permitting it to travel about at the same rate as do rolls 5 and 6, of the form shown in FIG. 5, the abrasive tips will break off fibers from the filaments of the tow and they will collect on the screen after being drawn pneumatically through the opening 108.

The sets of blades shown in FIG. 2 and the spider wheel shown in FIG. 12 can be used for purposes other than converting filaments into fibers, such as napping and softening a comparatively stiff sheet material, such as leather or woven goods. Such material can be fed between feed rolls 92 and 93, FIG. 12, and led over the spider wheel and then out of opening 108 by suction onto the conveyor 110. The abrasive tips will nap the under side of the material and the repeated beating by the bars will soften it. If the material were fed between feed rolls 5 and 6 to the zone Z, FIG. 7, the beater blades would nap both sides and also soften the material. The material will have a leading end portion to be fed downwardly between the blades and, as with the fibers of the tow, gravity will assist the down motion of the material to the screen conveyor.

The web made by the procedure set forth herein is characterized by two features which give it elasticity, cohesiveness and strength. One of these features is the presence in the web of a large percentage of fibers over 3″ in length. In the sample count made of a web made as described herein, the numbers of fibers of each of several different lengths were found to be as follows:

| Length, inches | ½ | 1 | 1½ | 2 | 2½ | 3 | 3½ | 4 | 4½ | 5 |
|---|---|---|---|---|---|---|---|---|---|---|
| Number | 1 | 10 | 6 | 10 | 5 | 6 | 15 | 12 | 6 | 8 |

Another feature of the web is the large number of localized areas A of reenforcing entanglements of the various fibers, many of the areas of entanglement including several long fibers which join and frictionally engage and radiate from the areas into other parts of the web. The strength growing out of these areas is due to the long fibers many of which are entangled with two or more of the localized areas. FIG. 10 indicates diagrammatically how the fibers are interconnected to form these localized areas of concentration and how some of the fibers are of sufficient length to connect two or more areas.

Samples of the web made as set forth herein have been subjected to bursting tests on the Ashton Burst Tester No. 98 such as shown for instance in Patent No. 2,727,386. This tester has a rubber diaphragm over which the test specimen is placed and clamped at its edges. Then hydraulic pressure under the diaphragm lifts the part of the web over it until the specimen bursts. In the test the subject web was compared with two other well-known webs commercially available, with the following results.

A single web made according to the invention weighing 35 grams per square yard was found to withstand a pressure of from 10 to 18 pounds per square inch, eight tests showing seven specimens nearer 10 pounds and one reaching 18 pounds. A first comparative web weighing 100 grams per square yard withstood pressures of 4 to 5 pounds per square inch, 6 tests being made, 5 of which were in the 4 to 4½ pound range and one of which reached 5 pounds. In a second comparative web weighing 60 grams per square yard there was one test which ran to 5½ pounds per square inch and two to eight pounds per square inch. The end of the tests is indicated by the bursting of the specimen as the rubber diaphragm bulges upwardly under hydraulic pressure.

In the second bursting test each of the three webs was doubled and it was found that the web made according to the present invention was able to withstand the full pressure which the testing machine could exert, that is, 57 pounds per square inch, without bursting. The first of the comparative webs burst at 9 pounds per square inch and the second comparative web had one break at 19 pounds per square inch and one at 23½ pounds per square inch.

Thus, it will be seen that although the web made according to this invention weighted much less per square yard than the other two webs it showed a marked superiority in strength which is believed to be due to the two features already mentioned, that is, the relative high percentage of long fibers which could transmit resisting force over a considerable area, and the localized areas of reenforcement.

An Instron Tensile Tester was used to compare the load-extension relation for a web made as set forth herein and webs made by two prior well known methods. In each instance the specimen tested was 3″ x 3″ with the jaws of the tester moving apart at the rate of five inches per minute, the jaws gripping opposite edges of the specimen and being two and one-half inches apart at the beginning of the test. In each instance the material was three denier viscose. The results of the tests are shown on FIG. 13 where the ordinates are the load in grams and the abscissas are percent elongation.

Curve A, representing the instant web weighing 110 grams per square yard, shows an extension or stretch of 47% when the load was increased to 78 grams, whereas a web of well known make and equal weight, as shown by curve C, had an extension of 82% when the load was only 51 grams. Curve B, representing the instant web weighing 40 grams per square yard, shows stretch of 39% when the load was 21 grams. Curve D, on the other hand, showing results with another web of well known make and same weight, indicates an extension of 110% where the load was only 13½ grams.

From FIG. 13 it will be seen that a web made as set forth herein has more than twice the resistance to stretch under tension than other commercially available webs. Thus, the abscissa of curve C equal to that of the top of curve A corresponds to 34½ grams compared with 78 grams for curve A, and the abscissa of curve D corresponding to the top of curve B shows only one-third the resistance to stretch under tension as does the instant 40 gram web.

So far as the web itself is concerned, it can be made as described in connection with FIGS. 2 and 11, or it can be made by cutting fibers of different lengths in the percentages desired, and then mixed and pneumatically deposited on a conveyor.

Referring again to FIG. 10, it is believed that the local entanglements indicated at areas A1, A2 and A3 are produced in part at least by several crossed filaments being caught in a notch of the beater blades prior to rupture or between abrasive elements 97, FIG. 12, and all breaking at once in a group and descending to the conveyor. Longer fibers are then deposited across the groups and still other fibers pneumatically packed down on these groups of long fibers. The long fibers in many instances are entangled with two or more areas, and frequently encircle, or at least pass part way around, the areas of entanglement. These areas seem to provide anchorages for the long fibers, and the longer fibers in crossing from one area to another enhance considerably the over-all quality of the web.

A number of specimens of web made as set forth herein have been examined microscopically and all appear to have characteristics similar to those shown in FIGS. 10 and 11. In FIG. 10 only three localized areas A1, A2 and A3 are shown but it is to be understood that these areas are distributed throughout the web and in many instances two or more of these areas will be connected by long fibers. Thus, in FIG. 10 fiber F1 is entangled with area A1 and A2, fiber F2 is entangled with area A1 and A3, the fiber F3 passes through area A1 without becoming entangled with other areas but extends into the adjacent fabric far enough to establish considerable frictional resistance with adjacent fibers between the areas. It should be understood that in FIG. 10 a good many of the shorter fibers have been omitted for the sake of clearance. Fiber F4 extends from area A2 to the periphery of area A3, while fiber F5 is somewhat similar to fiber F3 in that it is anchored in one of the areas, namely, A2, and then has considerable holding frictional resistance with other fibers of the web. Fibers F6 and F7 are shown as representative of the positions occupied by certain of the long fibers, some of which, as F7, do not necessarily become entangled with any of the areas.

Referring to FIG. 11, which shows an enlargement of one area but considerably magnified, fiber F8 is seen to encircle the area A4 while fiber F9 extends through the area A4 and then bends downwardly to curve off toward another area not shown in FIG. 11.

So far as the lengths of the fibers which are ruptured from the tow are concerned, it may be stated that in general the length of the fiber is dependent upon the number of blows the filaments of the tow receive while they are in the operating zone Z. The specimens shown in FIGS. 10 and 11 were made under conditions in which the tow was fed in at the rate of 12 inches per minute and the cylinders of the beater blades rotated at approximately 1500 r.p.m. With 24 blades acting on the tow for approximately one inch it can be computed that each inch of the filaments was subjected to about 3,000 blows. It was found by experiment that the beater blades could be operated at a somewhat higher speed so that an upper range of 5,000 blows per inch of feed would give satisfactory results. The range from 3,000 to 5,000, however, is believed to be the optimum number of blows for the production of fibers of sufficient length to add considerable strength to the web. The materials used in the test were viscose, acetate, Dacron and nylon, the viscose apparently producing a web of somewhat better appearance than that made by the other fibers. It should be noted that the machine and method set forth herein can operate on any continuous filament or group of filaments, including natural silk, but that it is not very satisfactory with yarns made from natural fibers, such as cotton and wool. The fibers previously mentioned in column 7, line 55, are to be considered only a typical count and we do not wish to be limited to the numbers of fibers of different lengths given hereinbefore since there is some variation from part to part of the web although the general average of fibers will be approximately as already stated. The more blades that are on the cylinders the shorter the fibers will be, provided the r.p.m. of the cylinders is about as already suggested. The higher the denier of the single filaments, that is, the greater the weight per unit length, the coarser or larger it is, the shorter the fibers in the web will be, due probably to greater brittleness.

Having now particularly described and ascertained the nature of the invention and in what manner the same is to be performed, what is claimed is:

1. In a machine for producing a nonwoven web from a tow of continuous filaments having a free leading end portion, a pair of feed rolls in side by side frictional contact between which the tow extends downwardly beyond said rolls and effective to deliver said portion downwardly in substantially vertical alignment with said contact at a given linear rate, a pair of oppositely rotatable members in side by side spaced relationship underneath and remote from said feed rolls and between which the leading end portion of the tow extends, tow beater blade elements on each of said members and extending radially therefrom in vertically meshing but nonengageable relationship remotely below and in substantially vertical alignment with said contact, and means to rotate said members and cause said elements to move downwardly along the filaments at said end portion at a rate several times said given rate and flex the end portion first in one direction and then in the opposite direction to effect rupture of said continuous filaments between said elements into discontinuous fibers of random lengths for deposition thereof on a conveyor to form the nonwoven web.

2. The machine set forth in claim 1 wherein a motor under control of a rheostat is provided to adjust the speed of the feed rolls and a motor driven expanding and contracting pulley is provided to adjust the rate of rotation of the members.

3. The machine set forth in claim 1 wherein the feed rolls act to apply a holding force to said tow to prevent the beater elements from moving the continuous filaments faster than said given linear rate, thereby facilitating the application of tensional stresses frictionally by the elements to the tow to rupture same.

4. The machine set forth in claim 1 wherein one of said feed rolls is metallic and the other has a deformable surface, the metallic roll being mounted in horizontal floating relationship with the other roll, and wherein a leaf spring in engagement with the metallic roll is provided to adjust the horizontal distance between the axes of said rolls whereby the metallic roll can effect varying amounts of deformation of the other roll.

5. The machine set forth in claim 1 wherein said elements are distributed angularly on their respective members and are separated by spaces and the elements move in vertically arcuate paths overlapping in a zone directly below said contact, the elements of each member registering with the spaces between the elements of the other member.

6. The machine set forth in claim 1 wherein the elements are rigid blades having notched edges which engage the filaments.

7. The machine set forth in claim 1 wherein the beater elements strike the filaments in a frictional downward brushing manner from 3000 to 5000 times for each inch of tow fed by the feed rolls.

8. The machine set forth in claim 1 wherein the elements during rotation of the members create a downward draft of air which separates and propels at least some of the fibers toward the conveyor.

9. The machine set forth in claim 8 wherein the elements rotate about horizontal axes below the horizontal axes of the feed rolls and when moving upwardly tend to create air streams in a direction to lift at least some of the fibers above the elements to enable such fibers to pass between the members with opportunity to become entangled with filaments between the members.

10. In a machine for producing a nonwoven web from a tow of continuous filaments, side by side feed rolls forming a nip and between which the tow extends downwardly effective to deliver the tow to an operating zone underneath said nip, beating means at the zone to apply frictional tensional stresses on the tow effective to rupture the continuous filaments extending into said zone into discontinuous fibers of random lengths, a closed circuit air system in which the rolls and beating means are located, a conveyor passing through said system, means forming part of said system to blow the discontinuous fibers onto the conveyor to form a web, and means to move the conveyor through said system at varying rates of speed to produce a web having some parts thereof thicker than other parts thereof.

11. In a machine for producing a nonwoven web from a tow of continuous filaments having a free leading end portion, feed rolls having their axes in a single horizontal plane and between which the tow extends downwardly effective to deliver the end portion downwardly at a given linear rate, two sets of beater blades beneath said rolls and having their axes in a single horizontal plane below said first-named plane and between which the free leading end portion extends, each set rotatable about and angularly spaced around a respective axis in said second-named plane, means to rotate said sets so that the blades of each set enter spaces between the blades of the other set, said means rotating the blades in a direction to draw the tow downwardly from said feed rolls and causing the blades to apply tensile stresses along the continuous filaments they engage at a linear rate several times as great as said given rate and causing the blades to rupture the continuous filaments into discontinuous fibers of random length, a closed air circuit system, a hopper forming a part of the system and having an inner chamber therein and enclosing said feed rolls and beater blades and having a delivery throat at the bottom of said chamber, a conveyor passing through the system and moving below said throat, and pneumatic means in the closed circuit to provide a differential in air pressures between the chamber and the hopper to effect advancement of the discontinuous fibers broken from the continuous filaments by the blades through the throat onto the conveyor.

12. The machine set forth in claim 11 wherein the blades have tow engaging edges which travel in downward paths which intersect between the axes of said sets and flex the filaments in opposite directions.

13. In a machine for converting a tow of continuous filaments into discontinuous fibers, a single set of feed rolls having their axes in a horizontal plane and between which the tow extends downwardly effective to deliver the tow at a given linear rate, two sets of beater blades beneath the feed rolls and mutually intermeshing to define a working zone directly below the feed rolls and into which the tow falls by gravity after leaving the rolls, means beneath said working zone to collect and remove the discontinuous fibers, and means to move the opposed blades of the sets in precisely spaced non-touching relation through said zone along the filaments at a downward rate of travel which is very much greater than said given linear rate, the intermeshing blades overlapping each other in said zone to a degree sufficient to flex and deflect the filaments alternately through large angles on both sides of the vertical travel path along which the tow enters the working zone and rupture the filaments into discontinuous fibers.

14. The machine set forth in claim 13 wherein the blades are mounted on cylinders rotatable about parallel axes in a single horizontal plane and the blades of each cylinder enter the spaces between the blades of the other cylinder when the cylinders are rotated.

15. The machine set forth in claim 13 wherein each set of blades rotates about its own separate axis and the blades of each set extend longitudinally of its axis beyond the zone of contact with the tow so that when rotating the blades create an air stream which carries the fibers downwardly away from said intersecting paths as well as away from the continuous filaments.

16. The machine set forth in claim 13 wherein each blade has a sharpened edge running the length of the blade and having plural spaced shallow V-shaped notches into which some of the filaments extend.

17. The machine set forth in claim 16 wherein the blades have sharp edges within the notches.

18. The machine set forth in claim 17 wherein the sharp edges deflect and abrade the filaments in a manner to effect a high coefficient of friction between the edges and the filaments to weaken them and facilitate breakage of the filaments into fibers.

19. In a machine for converting a tow of filaments into a nonwoven web, a hopper including an inner chamber into which the filaments pass downwardly, a conveyor adjacent and below the inner chamber for fibers movable in a given direction, a fiber and air deflector forming part of the inner chamber and inclined toward the conveyor in said direction, and intermeshing opposed rotary blade means above the deflector and within the chamber disposed to receive the tow and effective to break fibers from the filaments in random lengths and blow them against the deflector and toward the conveyor using air turbulance created by the rotary blade means, the deflector causing at least some of the fibers to slide therealong and assume a transverse position relative to the conveyor before reaching the latter.

References Cited in the file of this patent

UNITED STATES PATENTS

| | | |
|---|---|---|
| 42,847 | Gillman | May 24, 1864 |
| 407,665 | Johnston | July 23, 1889 |
| 860,696 | Scherf | July 23, 1907 |
| 873,169 | Scherf | Dec. 10, 1907 |
| 1,213,527 | Morley | Jan. 23, 1917 |
| 1,340,809 | Wilcox | May 18, 1920 |
| 1,555,865 | McConnell | Oct. 6, 1925 |
| 1,940,975 | Shaver | Dec. 26, 1933 |
| 2,419,320 | Lohrke | Apr. 22, 1947 |
| 2,438,469 | Wilkie | Mar. 23, 1948 |
| 2,635,301 | Schubert et al. | Apr. 21, 1953 |
| 2,719,336 | Stotler | Oct. 4, 1955 |
| 2,941,264 | Fleissner | June 21, 1960 |
| 3,015,145 | Cohn et al. | Jan. 2, 1962 |

FOREIGN PATENTS

| | | |
|---|---|---|
| 363,094 | France | Apr. 25, 1906 |